United States Patent
Yokohama et al.

(10) Patent No.: US 8,192,009 B2
(45) Date of Patent: Jun. 5, 2012

(54) INK SET AND INK CARTRIDGE FOR INK-JET RECORDING, INK-JET RECORDING METHOD, AND INK-JET RECORDING APPARATUS

(75) Inventors: Yuuki Yokohama, Atsugi (JP); Akihiko Gotoh, Atsugi (JP); Mariko Kojima, Komae (JP); Hisashi Habashi, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 363 days.

(21) Appl. No.: 12/589,568

(22) Filed: Oct. 23, 2009

(65) Prior Publication Data
US 2010/0112219 A1 May 6, 2010

(30) Foreign Application Priority Data
Oct. 30, 2008 (JP) .................................. 2008-279323

(51) Int. Cl.
*C09D 11/02* (2006.01)

(52) U.S. Cl. ......... 347/100; 347/89; 347/95; 106/31.13; 106/31.27; 106/31.6

(58) Field of Classification Search ............ 347/95–100, 347/89; 106/31.13, 31.28, 31.6, 31.27
See application file for complete search history.

(56) References Cited

U.S. PATENT DOCUMENTS

| | | | |
|---|---|---|---|
| 6,113,679 A * | 9/2000 | Adkins et al. | 106/31.6 |
| 6,602,333 B2 * | 8/2003 | Miyabayashi | 106/31.27 |
| 6,886,931 B2 * | 5/2005 | Yatake | 347/100 |
| 7,530,682 B2 * | 5/2009 | Tawaraya et al. | 347/95 |
| 7,909,448 B2 * | 3/2011 | Iwata et al. | 347/100 |
| 8,029,123 B2 * | 10/2011 | Ikuno et al. | 347/100 |
| 8,044,114 B2 * | 10/2011 | Habashi et al. | 523/160 |
| 2004/0035322 A1 * | 2/2004 | Ishizuka et al. | 106/31.59 |
| 2004/0069182 A1 * | 4/2004 | Nakajima | 106/31.13 |
| 2004/0227798 A1 * | 11/2004 | Nakajima | 347/100 |
| 2007/0221078 A1 * | 9/2007 | Namba et al. | 101/327 |
| 2009/0041940 A1 | 2/2009 | Yokohama et al. | |
| 2009/0047431 A1 | 2/2009 | Hatada et al. | |

FOREIGN PATENT DOCUMENTS

| | | |
|---|---|---|
| JP | 54-059936 | 5/1979 |
| JP | 56-064877 | 6/1981 |
| JP | 06-071882 | 3/1994 |
| JP | 2002-038061 | 2/2002 |
| JP | 2002-146246 | 5/2002 |
| JP | 2003-041172 | 2/2003 |
| JP | 2003-192957 | 7/2003 |
| JP | 2004-359960 | 12/2004 |
| JP | 2006-282986 | 10/2006 |
| JP | 2007-146135 | 6/2007 |
| JP | 2007-262413 | 10/2007 |
| WO | WO 01/44384 A1 | 6/2001 |

* cited by examiner

*Primary Examiner* — Matthew Luu
*Assistant Examiner* — Rut Patel
(74) *Attorney, Agent, or Firm* — Cooper & Dunham LLP

(57) ABSTRACT

An ink set for ink-jet recording which includes multiple inks having different colors. Each of the multiple inks includes a colorant, a water-soluble organic solvent, a fluorine-based surfactant, and water. The viscosity difference among the multiple inks is 2.0 mPa·s or less at a temperature of 25° C. and a shearing speed of 230 1/s, and the viscosity difference among the multiple inks is 0.5 mPa·s or less at a temperature of 25° C. and a shearing speed of 100,000 1/s.

5 Claims, 2 Drawing Sheets

INK SET AND INK CARTRIDGE FOR INK-JET RECORDING, INK-JET RECORDING METHOD, AND INK-JET RECORDING APPARATUS

BACKGROUND OF THE INVENTION

1. Field of the Invention

The present invention relates to an ink set and an ink cartridge for ink-jet recording, an ink-jet recording method, and an ink-jet recording apparatus.

2. Discussion of the Related Art

A typical ink-jet printer contains an ink set including multiple inks, for example, cyan, magenta, yellow, and black inks. Each of the inks includes a different colorant in a different amount. Therefore, each of the inks has a different thixotropic property, and viscosity of each of the inks has a different dependency on shearing speed. In other words, viscosity variation relative to shearing speed variation is different among the inks. It may be difficult to make viscosity difference small among multiple inks over the whole range of shearing speed. Accordingly, viscosity difference among multiple inks is generally made small only at low shearing speeds or at high shearing speeds.

When viscosity difference among multiple inks is large at high shearing speeds, satellites or ink mists are disadvantageously generated when the ink is discharged. A typical ink-jet printer discharges liquid ink droplets from nozzles of a recording head toward a recording medium to form an image thereon. It may occur that main droplets have long trails and the long trails separate from the main droplets as small droplets. Such small droplets are called satellites. Ink mists are formed in the same way as satellites, but are much smaller in size than satellites. Satellites are likely to degrade the resultant image quality, and ink mists are likely to cause faulty operation of printers.

When viscosity difference among multiple inks is large at low shearing speeds, the resultant images may blur because the multiple inks each have different permeation speeds through paper.

Japanese Patent Application Publication No. (hereinafter "JP-A") 2007-146135 discloses an ink set containing multiple inks. The viscosity difference among the multiple inks is set to between 0 and 0.8 mPa·s at low shearing speeds. The viscosity is measured using an R-type viscometer from Toki Sangyo Co., Ltd. The measuring range of shearing speed is 320 (1/s) or less. There is no mention of the viscosity difference at high shearing speeds, but that might be large so long as the viscosity difference at low shearing speeds is small, because it may be difficult to reduce viscosity difference among multiple inks either at low shearing speeds or at high shearing speeds.

JP-A 2003-41172 also discloses an ink set containing multiple inks. The viscosity difference among the multiple inks is set to 0.5 mPa·s or less at high shearing speeds. There is no mention of the viscosity difference at low shearing speeds, but that might be large so long as the viscosity difference at high shearing speeds is small, because it may be difficult to reduce viscosity difference among multiple inks either at low shearing speeds or at high shearing speeds. Additionally, referring to Example 4 of the publication, the pigment concentration difference among the multiple inks is 0.5% at least, which may create viscosity difference among the multiple inks regardless of shearing speed.

JP-A 2006-282986 discloses an ink which comprises a fluorine-based surfactant for preventing image blurring. However, there is no mention of the relation between viscosity and shearing speed.

SUMMARY OF THE INVENTION

Accordingly, exemplary embodiments of the present invention provide an ink set, an ink cartridge, an ink-jet recording method, and an ink-jet recording apparatus, each of which provides high discharge stability and high quality images without image blurring.

These and other features and advantages of the present invention, either individually or in combinations thereof, as hereinafter will become more readily apparent can be attained by exemplary embodiments described below.

One exemplary embodiment provides an ink set for ink-jet recording which includes multiple inks having different colors. Each of the multiple inks includes a colorant, a water-soluble organic solvent, a fluorine-based surfactant, and water. A viscosity difference among the multiple inks is 2.0 mPa·s or less at a temperature of 25° C. and a shearing speed of 230 1/s, and a viscosity difference among the multiple inks is 0.5 mPa·s or less at a temperature of 25° C. and a shearing speed of 100,000 1/s.

Another exemplary embodiment provides an ink cartridge which includes a container and the above ink set contained in the container.

Yet another exemplary embodiment provides an ink-jet recording method which includes applying a stimulus to the multiple inks in the above ink set and flying the multiple inks to form an image.

Yet another exemplary embodiment provides an ink-jet recording apparatus which includes a stimulus applying device configured to apply a stimulus to the multiple inks in the above ink set and an ink flying device configured to fly the multiple inks to form an image.

In another exemplary embodiment, each of the multiple inks further includes at least one of a polyurethane resin emulsion and an acrylic silicone resin emulsion.

BRIEF DESCRIPTION OF THE DRAWINGS

A more complete appreciation of the embodiments described herein and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
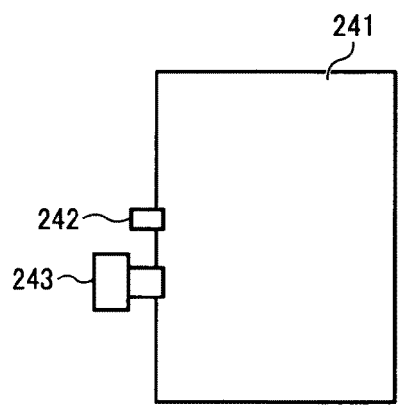
FIG. 1 is a schematic view illustrating an embodiment of an ink bag.

An exemplary embodiment of the present invention provides an ink set which includes multiple inks in which the viscosity difference among the multiple inks is 2.0 mPa·s or less at a temperature of 25° C. and a shearing speed of 230 1/s and the viscosity difference among the multiple inks is 0.5 mPa·s or less at a temperature of 25° C. and a shearing speed of 100,000 1/s.

Because the viscosity difference among the multiple inks at a shearing speed of 100,000 1/s is 0.5 mPa·s or less, ink mists may be reduced when the inks are discharged from multiple heads each at the same frequency.

The viscosity difference among the multiple inks at a shearing speed of 230 1/s is 2.0 mPa·s or less. When the viscosity difference at a shearing speed of 230 1/s is greater than 2.0 mPa·s, it is likely that significant image blurring may occur when the inks land on a recording medium.

The inks used for the present invention include a fluorine-based surfactant. The use of fluorine-based surfactants prevents the occurrence of image blurring. Therefore, the ink set of the present invention provides images with excellent image quality, even though the above-described viscosity difference exists among the multiple inks.

If the viscosity difference among the multiple inks is large at low shearing speeds, the amount of ink supplied from an ink cartridge to a recording head may largely vary among the multiple inks.

The ink set of the present invention includes multiple inks, for example, black, cyan, magenta, and yellow inks. The ink set of the present invention may further include special inks such as a red ink and a green ink, and light-color inks such as a light cyan ink and a light magenta ink.

As described above, the inks used for the present invention include a fluorine-based surfactant. Generally, when the viscosity difference among multiple inks is small at high shearing speeds, ink mists can be reduced. However, image blurring that occurs when the inks land on a recording medium may not be prevented thereby. Additionally, when the viscosity difference among multiple inks is large at low shearing speeds, the resultant images may blur because the multiple inks have different permeation speeds through a recording medium. Since the inks used for the present invention include a fluorine-based surfactant, the inks can rapidly permeate through recording media. Therefore, the occurrence of image blurring may be effectively prevented by setting the viscosity difference among multiple inks at low shearing speeds to within the above-described range.

Suitable fluorine-based surfactants preferably include 2 to 16 fluorine-substituted carbon atoms, and more preferably 4 to 16 fluorine-substituted carbon atoms. When the number of fluorine-substituted carbon atoms is too small, fluorine may produce no effect. When the number of fluorine-substituted carbon atoms is too large, storage stability of the resultant ink may be poor.

Specific examples of usable fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group as a side chain.

Specific examples of usable perfluoroalkyl sulfonic acid compounds include, but are not limited to, perfluoroalkyl sulfonic acid and perfluoroalkyl sulfonate.

Specific examples of usable perfluoroalkyl carboxylic acid compounds include, but are not limited to, perfluoroalkyl carboxylic acid and perfluoroalkyl carboxylate.

Specific examples of usable perfluoroalkyl phosphate compounds include, but are not limited to, perfluoroalkyl phosphate and salts of perfluoroalkyl phosphate.

Specific examples of usable polyoxyalkylene ether polymer compounds having a perfluoroalkyl ether group as a side chain include, but are not limited to, polyoxyalkylene ether polymer having a perfluoroalkyl ether group as a side chain, sulfates thereof, and salts thereof.

The counter ions in the fluorine-based surfactants may be Li, Na, K, $NH_4$, $NH_2CH_2CH_2OH$, $NH_2(CH_2CH_2OH)_2$, and $NH(CH_2CH_2OH)_3$, for example.

The fluorine-based surfactants may be either synthesized compounds or commercially available products.

Specific examples of commercially available fluorine-based surfactants include, but are not limited to, SURFLON® S-111, S-112, S-113, S-121, S-131, S-132, S-141, and S-145 (from AGC Seimi Chemical Co., Ltd.); FLUORAD™ FC-93, FC-95, FC-98, FC-129, FC-135, FC-170C, FC-430, and FC-431 (from 3M); MEGAFACE F-470, F-1405, and F-474 (from DIC Corporation); ZONYL® TBS, FSP, FSA, FSN-100, FSN, FSO-100, FSO, FS-300, and UR (from Du Pont); FTERGENT FT-110, FT-250, FT-251, FT-400S, FT-150, and FT-400SW (from Neos Company Limited); and PF-151N (from OMNOVA Solutions Inc.).

Specific preferred examples of the fluorine-based surfactants include, but are not limited to, the following compounds having the formulae (1) to (3). Among these compounds, compounds having the formula (1) are preferable.

$$CF_3CF_2(CF_2CF_2)_m-CH_2CH_2O(CH_2CH_2O)_nH \qquad (1)$$

wherein m represents an integer of from 0 to 10 and n represents an integer of from 1 to 40.

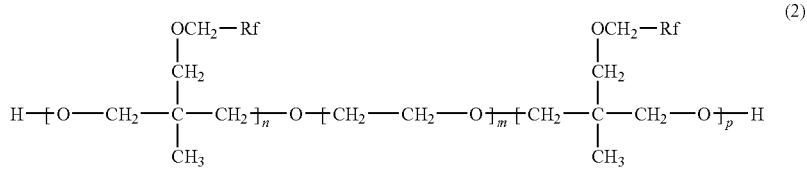

(2)

wherein Rf represents $CF_3$ or $CF_2CF_3$, m represents an integer of from 6 to 25, n represents an integer of from 1 to 4, and p represents an integer of from 1 to 4.

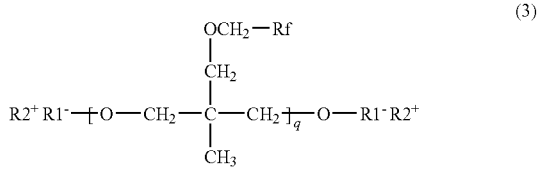

(3)

wherein Rf represents $CF_3$ or $CF_2CF_3$, $R1^-$ represents an anionic group, $R2^+$ represents a cationic group, and q represents an integer of from 1 to 6.

The above-described fluorine-based surfactants can be used alone or in combination.

The ink preferably includes the fluorine-based surfactant in an amount of from 0.1 to 10% by weight, and more preferably from 0.1 to 5% by weight. When the amount is too small, permeability of the ink may not drastically improve. When the amount is too large, the viscosity of the ink may increase when stored in high-temperature conditions, and therefore the ink may aggregate.

The ink preferably has a surface tension of from 20 to 30 mN/m at 25° C. When the surface tension is too large, the ink may permeate in a recording medium so slowly that the occurrence of image blurring may not be sufficiently prevented. In the present specification, the surface tension is a static surface tension which may be measured with a surface tensiometer CBVP-Z (from Kyowa Interface Science Co., Ltd.) using a platinum plate.

The ink further includes a water-soluble organic solvent for the purpose of having water retentivity and wettability. Such an ink expresses excellent storage stability for an extended period of time because aggregation of colorants and increase of viscosity are suppressed. In addition, the ink keeps high fluidity for an extended period of time even being exposed and dried at ends of nozzles in ink-jet printers. Moreover, the occurrence of nozzle clogging is prevented either during printing operation or at the time of re-operation after interruption, providing high discharge reliability.

The ink preferably includes the water-soluble organic solvent in an amount of from 5 to 50% by weight, and more preferably from 20 to 45% by weight.

Specific examples of usable water-soluble organic solvents include, but are not limited to, polyvalent alcohols such as ethylene glycol, diethylene glycol, 1,3-butylglycol, 3-methyl-1,3-butylglycol, triethylene glycol, polyethylene glycol, pblypropyleneglycol, 1,5-pentanediol, 1,6-hexanediol, glycerin, 1,2,6-hexanetriol, 2-ethyl-1,3-hexanediol, 2-ethyl-1,2,4-butanetriol, 1,2,3-butanetriol, and petriol; alkyl ethers of polyvalent alcohols, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers of polyvalent alcohols, such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl imidazolidinone, ε-caprolactam, and γ-butyrolactone; amides such as formamide, N-methylformamide, and N—N-dimethylformamide; amines such as monoethanolamine, diethanolamine, and triethylamine; sulfur-containing compounds such as dimethylsulfoxide, sulfolane, and thiodiethanol; and propylene carbonate and ethylene carbonate. Among these solvents, 1,3-butylglycol, diethylene glycol, triethylene glycol, and glycerin are preferable because these solvents can prevent ink clogging and deterioration of discharge performance, which are generally caused by drying, and can improve color saturation of the resultant image.

The above-described water-soluble organic solvents can be used alone or in combination.

The ink further includes a colorant. The colorant may be either a dye or a pigment. From the viewpoint of resistance to water and light, pigments are preferable.

Specific examples of usable pigments include, but are not limited to, organic pigments such as azo pigments, phthalocyanine pigments, anthraquinone pigments, quinacridone pigments, dioxane pigments, indigo pigments, thioindigo pigments, perylene pigments, isoindolinone pigments, aniline black pigments, azomethine pigments, rhodamine B lake pigments, and carbon blacks; and inorganic pigments such as iron oxides, titanium oxides, calcium oxides, barium oxides, aluminum hydroxides, barium yellow, iron blue, cadmium red, chrome yellow, and metal powders.

Suitable carbon blacks for black inks may be produced by a furnace method or a channel method, for example. Suitable carbon blacks preferably have a primary particle diameter of from 15 to 40 mµ, a BET specific surface area of from 50 to 300 m$^2$/g, a DBP oil absorption value of from 40 to 150 ml/100 g, and a pH value of from 2 to 9, and include volatile components in an amount of from 0.5 to 10%. Specific examples of such carbon blacks which are commercially available include, but are not limited to, No. 2300, No. 900. MCF-88, No. 33, No. 40, No. 45, No. 52, MA7, MA8, MA100, and No. 2200B (from Mitsubishi Chemical Corporation); RAVEN® 700, RAVEN® 5750, RAVEN® 5250, RAVEN® 5000, RAVEN® 3500, and RAVEN® 1255 (from Columbian Chemicals Company); REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400 (from Cabot Corporation); and COLOR BLACK FW1, COLOR BLACK FW2, COLOR BLACK FW2V, COLOR BLACK FW18, COLOR BLACK FW200, COLOR BLACK 5150, COLOR BLACK S160, COLOR BLACK S170, PRINTEX® 35, PRINTEX® U, PRINTEX® V, PRINTEX® 140U, PRINTEX® 140V, SPECIAL BLACK 6, SPECIAL BLACK 5, SPECIAL BLACK 4A, and SPECIAL BLACK 4 (from Degussa).

Specific examples of usable pigments for yellow inks include, but are not limited to, C.I. Pigment Yellow 1, 2, 3, 12, 13, 14, 16, 17, 73, 74, 75, 83, 93, 95, 97, 98, 114, 120, 128, 129, 138, 150, 151, 154, 155, 174, and 180.

Specific examples of usable pigments for magenta inks include, but are not limited to, C.I. Pigment Red 5, 7, 12, 48(Ca), 48(Mn), 57(Ca), 57:1, 112, 122, 123, 146, 168, 176, 184, 185, and 202, and C.I. Pigment Violet 19.

Specific examples of usable pigments for cyan inks include, but are not limited to, C.I. Pigment Blue 1, 2, 3, 15, 15:3, 15:4, 15:34, 16, 22, 60, 63, and 66, and C.I. Vat Blue 4 and 60.

In addition to the above-described pigments, newly-synthesized colorants are also usable for the present invention.

A combination of C.I. Pigment Blue 15 as a cyan pigment, C.I. Pigment Red 122 and C.I. Pigment Violet 19 as magenta pigments, and C.I. Pigment Yellow as a yellow pigment provides a good balance between color tone and light resistance.

The ink preferably includes the colorant in an amount of from 0.1 to 50.0% by weight, and more preferably from 0.1 to 20.0% by weight.

The colorant preferably has an average particle diameter (D50) of 150 nm or less, and more preferably 100 nm or less. The average particle diameter of colorants may be measured using a particle size analyzer MICROTRAC UPA (from Nikkiso Co., Ltd.) with a dynamic light scattering method at 23° C., 55% RH.

The ink preferably includes a polyurethane resin emulsion and/or an acrylic silicone resin emulsion.

Resin emulsions are supposed to thicken (i.e., improve viscosity) or aggregate when the ink lands on a recording medium such as paper, thereby preventing permeation of colorants and accelerating fixation of the ink on the recording medium. Some resin emulsions may form a thin film on a recording medium, thereby further improving abrasion resistance of the resultant printings. Additionally, resin emulsions may improve dispersion stability of colorants in the ink.

The resin emulsion may be in the form of an O/W emulsion either when used as a raw material of the inks or after the inks are prepared.

Polyurethane resin emulsions generally include emulsions which are prepared by emulsifying a relatively-hydrophilic polyurethane resin using an emulsifier and self-emulsified emulsions which are prepared by emulsifying a polyurethane resin to which a functional group having a function of emulsification is introduced by copolymerization, etc. All of these polyurethane emulsions are usable. When the colorant is a pigment, dispersion stability of the pigment and emulsion particles depends on the composition of the ink. For example, anionic self-emulsified polyurethane resin emulsions provide excellent dispersion stability. Form the viewpoint of retention and dispersion stability of pigments, the polyurethane resin is preferably an ether type rather than a polyester type or a polycarbonate type. This is because non-ether type polyurethane resins are likely to have poor resistance to solvents and aggregate when stored at high temperatures.

Specific examples of usable commercially available resin emulsions include, but are not limited to, UVA383MA (an acrylic silicone resin emulsion, from BASF); AP4710 (an acrylic silicone resin emulsion, from Showa Highpolymer Co., Ltd.); and SF460, SF460S, SF420, SF110, SF300, and SF361 (polyurethane resin emulsions, from Nippon Unicar Co., Ltd.).

The ink preferably includes the resin emulsion in an amount of from 0.1 to 20% by weight, and more preferably from 0.2 to 10% by weight, on solid basis. When the amount of solid resin is too small, colorants are insufficiently covered with the resin when the ink lands on a recording medium. As a result, the resultant image may have poor abrasion resistance. When the amount of solid resin is too large, the ink may have too large a viscosity to be applied to an ink-jet printer.

The ink may further include additives such as an antifoamer, a pH adjuster, an antiseptic fungicide, an anticorrosive, an antioxidant, an ultraviolet absorber, and a light stabilizer.

Specific examples of usable antifoamers include, but are not limited to, silicone antifoamers, polyether antifoamers, and fatty acid ester antifoamers. These antifoamers can be used alone or in combination. Among these antifoamers, silicone antifoamers are preferable because of having excellent foam breaking ability.

Specific examples of usable antiseptic fungicides include, but are not limited to, 1,2-benzisothiazoline-3-one, sodium dehydroacetate, sodium sorbate, 2-pyridinethiol-1-oxide sodium, sodium benzoate, and pentachlorophenol sodium.

Suitable pH adjusters are supposed to adjust the pH of the ink to 7 or more without adversely affecting the ink. Specific examples of usable pH adjusters include, but are not limited to, amines such as diethanolamine and triethanolamine; hydroxides of alkaline metals, such as lithium hydroxides, sodium hydroxides, and potassium hydroxides; ammonium hydroxides; quaternary ammonium hydroxides; quaternary phosphonium hydroxides; and carbonates of alkali metals such as lithium carbonate, sodium carbonate, and potassium carbonate.

Specific examples of usable anticorrosives include, but are not limited to, acidic sulfite, sodium thiosulfate, ammonium dithioglycolate, diisopropyl ammonium nitrite, pentaerythritol tetranitrate, and diisohexyl ammonium nitrite.

Specific examples of usable antioxidants include, but are not limited to, phenol antioxidants (including hindered phenol antioxidants), amine antioxidants, sulfur-based antioxidants, and phosphate-based antioxidants.

The ink may be contained in an ink cartridge. The ink cartridge may further include other members such as containers.

An exemplary embodiment of the ink cartridge includes multiple containers containing multiple inks respectively. Another exemplary embodiment of the ink cartridge includes a single container containing a single ink.

The shape, structure, size, and material of the container are not particularly limited. For example, ink bags made of aluminum laminate films or resin films are preferable.

Figure 2:
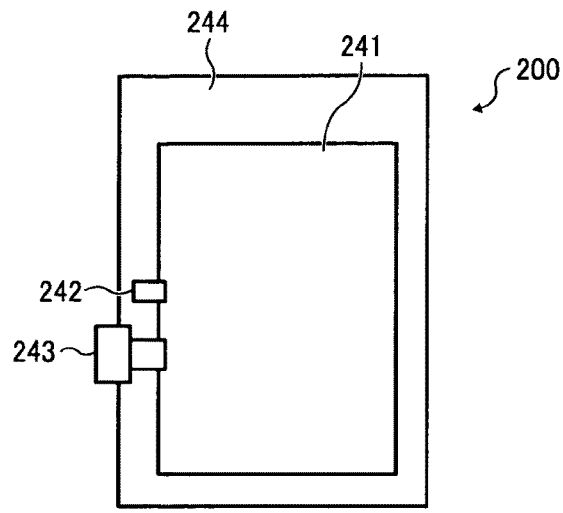
FIG. 2 is a schematic view illustrating an embodiment of an ink cartridge including the ink bag illustrated in FIG. 1.

An exemplary embodiment of an ink cartridge of the present invention is described below with reference to FIGS. 1 and 2. FIG. 1 is a schematic view illustrating an embodiment of an ink bag. FIG. 2 is a schematic view illustrating an embodiment of an ink cartridge including the ink bag illustrated in FIG. 1.

Referring to FIG. 1, an ink bag 241 is filled with an ink from an ink inlet 242. After exhausting air from the ink bag 241, the ink inlet 242 is sealed by fusion. The ink is supplied to the main body of an ink-jet recording apparatus by inserting a needle, which is connected to the ink-jet recording apparatus, into an ink outlet 243 made of a rubber member. The ink bag 241 is made of a packing material such as an aluminum laminate film which has no air permeability. As illustrated in FIG. 2, the ink bag 241 is contained in a cartridge case 244 made of aplastic. The resulting ink cartridge 200 is detachably mounted on an ink-jet recording apparatus.

The ink cartridge 200 may be mounted on the ink-jet recording apparatus which is an exemplary embodiment of the present invention (to be described later).

An exemplary embodiment of an ink-jet recording method includes an ink flying process, and optionally includes other processes such as a stimulus generating process and a control process.

An exemplary embodiment of an ink-jet recording apparatus includes an ink flying device, and optionally includes other devices such as a stimulus generating device and a control device.

The ink-jet recording method is preferably performed by the ink-jet recording apparatus. The ink flying process is preferably performed by the ink flying device. The other processes are preferably performed by corresponding devices.

The ink flying process is a process in which a stimulus is applied to an ink so that the ink flies to form an image.

The ink flying device is configured to apply a stimulus to an ink so that the ink flies to form an image. An exemplary embodiment of the ink flying device includes an ink-jet head, for example.

Exemplary embodiments of the ink-jet head include the following (1) to (3), for example.

(1) A piezo ink-jet head disclosed in Unexamined Japanese Application Publication No. (hereinafter JP-B) 02-51734, the disclosure thereof being incorporated herein by reference, configured to discharge ink droplets by changing the volume of an ink flow path. The volume of the ink flow path is changed by deforming a vibration plate that forms the ink flow path using a piezoelectric element. The piezoelectric element serves as a pressure generating device configured to pressurize an ink in the ink flow path.

(2) A thermal ink-jet head disclosed in JP-B 61-59911, the disclosure thereof being incorporated herein by reference, configured to generate bubbles in an ink flow path by heating an ink using a heat-generating resistance body.

(3) An electrostatic ink-jet head disclosed in JP-A 06-71882, the disclosure thereof being incorporated herein by reference, configured to discharge ink droplets by changing the volume of an ink flow path. The ink flow path is formed by a vibration plate that is provided facing an electrode. The volume of the ink flow path is changed by deforming the vibration plate by electrostatic force generated between the vibration plate and the electrode.

The stimulus may be generated by the stimulus generating device. The stimulus may be heat (temperature), pressure, vibration, or light, for example. These stimuli may be used alone or in combination. Among these stimuli, heat and pressure are preferable.

Exemplary embodiments of the stimulus generating device include, but are not limited to, a heating device, a pressurizing device, a piezoelectric element, a vibration generating device, an ultrasonic oscillator, and a light. Specific examples of such stimulus generating devices include, but are not limited to, piezoelectric actuators such as piezoelectric elements; thermal actuators such as heat-generating resistance bodies, which use phase change caused by film boiling of liquids using a thermoelectric conversion element; shape-memory alloy actuators which use metal phase change caused by temperature change; and electrostatic actuators which use electrostatic force.

An exemplary embodiment of an ink-jet recording apparatus of the present invention is described below with reference to FIGS. 3 and 4.

Figure 3:
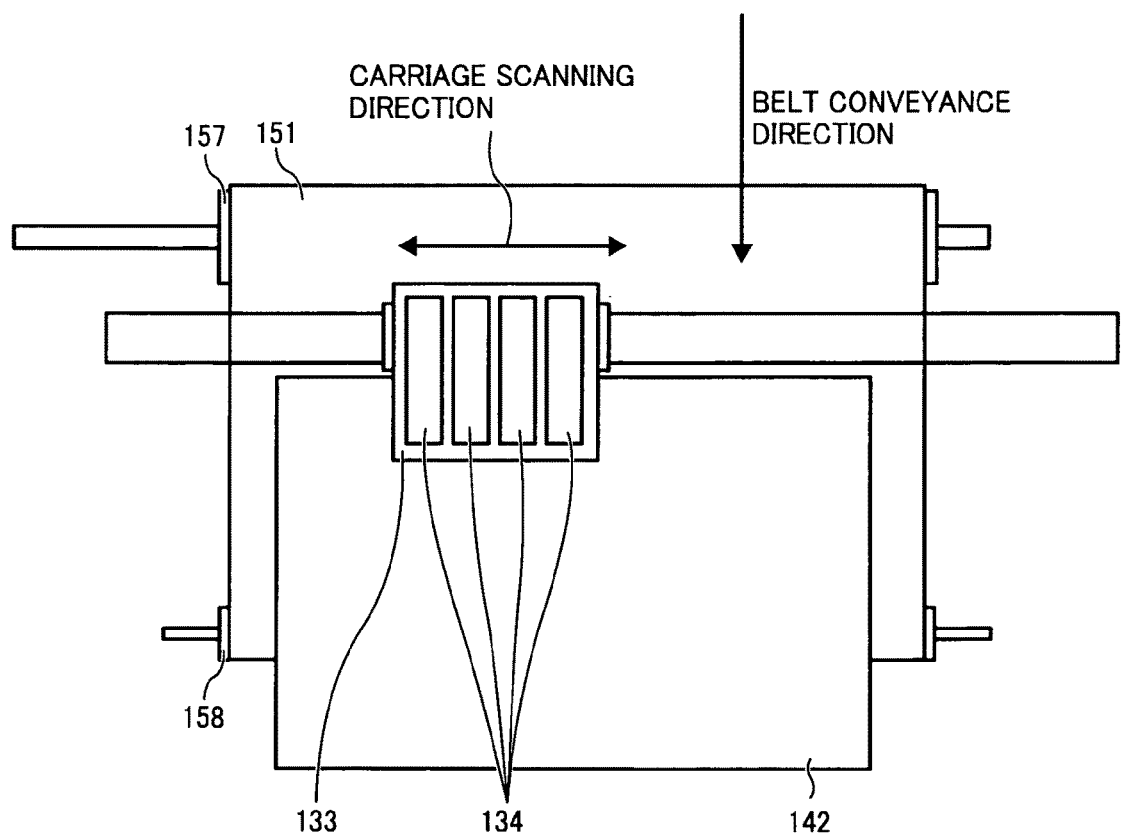
FIG. 3 is a schematic view illustrating an embodiment of an ink-jet recording apparatus.

FIG. 3 is a schematic view illustrating an embodiment of an ink-jet recording apparatus. An ink-jet recording apparatus illustrated in FIG. 3 includes four ink-jet heads 134, a carriage 133, a conveyance belt 151, a driving roller 157, and a driven roller 158. The ink-jet heads 134 are configured to discharge ink droplets onto a recording paper 142. The carriage 133 is configured to carry the four ink-jet heads 134 in the direction of movement of the carriage 133 (i.e., the main scanning direction) by mounting the four ink-jet heads 134. The conveyance belt 151 is configured to convey the recording paper 142 in the direction of conveyance of the conveyance belt 151 (i.e., a sub-scanning direction). The conveyance belt 151 is stretched taut by the driving roller 157 and the driven roller 158.

The ink-jet recording apparatus further includes an ink cartridge, a carriage driver, a belt driver, a head driver, and a maintenance device, all of which are not shown. The ink cartridge is configured to respectively supply different-color inks (yellow, cyan, magenta, and black inks, for example) to the ink-jet heads 134. The carriage driver is configured to move the carriage 133 in the direction of scanning of the carriage 133. The belt driver is configured to rotate the driving roller 157 so that the conveyance belt 151 moves. The head driver is configured to drive the ink-jet heads 134 to discharge ink droplets. The maintenance device is provided on an end of a scanning area of the carriage 133, and is configured to perform maintenance of the ink-jet heads 134. The maintenance device comprises a cap, a wiper blade, an idle discharge receiver, and a wiper cleaner.

The ink-jet recording apparatus is configured to form (print) an image on the recording paper 142 by discharging the inks onto the recording paper 142 while moving the four ink-jet heads 134 by the carriage 133 in the direction of scanning of the carriage 133 and conveying the recording paper 142 in the direction of conveyance of the conveyance belt 151.

Figure 4:
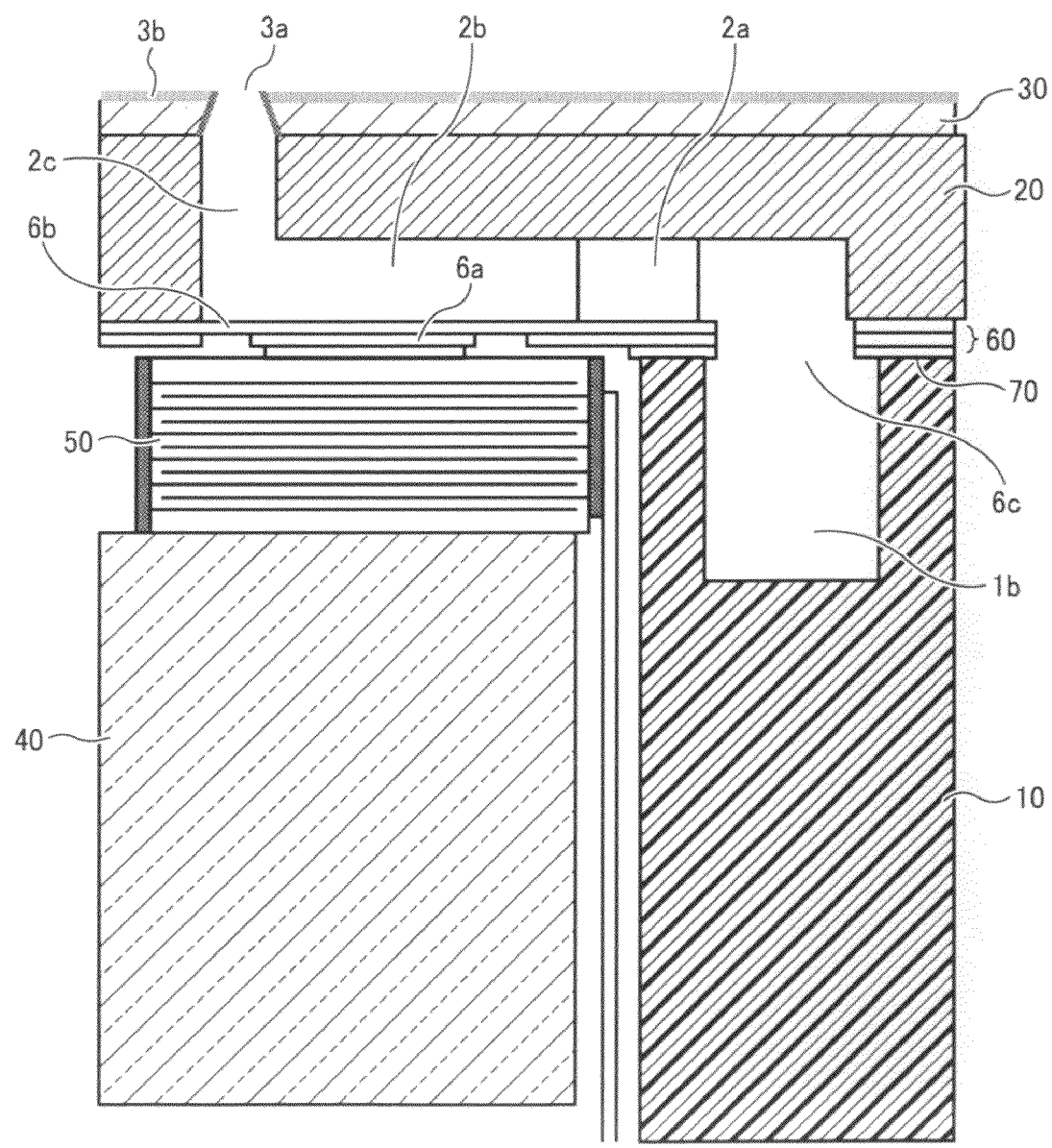
FIG. 4 is a schematic magnified view illustrating an embodiment of an ink-jet head.

FIG. 4 is a schematic magnified view illustrating an embodiment of an ink-jet head. The ink-jet head illustrated in FIG. 4 is a piezo ink-jet head, which includes an ink feed opening, not shown, a frame 10, a fluid resistance part 2a, a pressure liquid chamber 2b, a flow path plate 20, a nozzle plate 30, a base 40, a multi-layer piezoelectric element 50, a vibration plate 60, and an adhesion layer 70. A common liquid chamber 1b is formed within the frame 10. The pressure liquid chamber 2b is formed by engraving. The flow path plate 20 forms a communication opening 2c that communicates with a nozzle 36. Multiple nozzles 3a are formed on the nozzle plate 30. The multi-layer piezoelectric element 50 is fixed on the base 40, and a driving waveform is applied thereto from the head driver. The vibration plate 60 includes a convex part 6a that is bonded to the multi-layer piezoelectric element 50, a diaphragm 6b, and an ink inlet 6c. The adhesion layer 70 bonds the multi-layer piezoelectric element 50 to the vibration plate 60. The ink-jet head is not limited to a piezo ink-jet head, and may be a thermal ink-jet head or an electrostatic ink-jet head, for example.

The nozzle plate 30 may be made of a metallic material such as a thin film coated with Ni which may be formed by electroforming, for example. On an ink-discharge-side surface of the nozzle plate 30, an ink repellent layer 3b is formed.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Synthesis Example 1

A 1-liter flask equipped with a mechanical stirrer, a thermometer, a nitrogen gas inlet pipe, a condenser, and a dropping funnel was subjected to nitrogen substitution. The flask was then charged with 11.2 g of styrene, 2.8 g of acrylic acid, 12.0 g of lauryl methacrylate, 4.0 g of polyethylene glycol methacrylate, 4.0 g of a styrene macromer (AS-6 from Toagosei Co., Ltd.), and 0.4 g of mercaptoethanol, and heated to 65° C. A mixture liquid including 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer (AS-6 from Toagosei Co., Ltd.), 3.6 g of mercaptoethanol, 2.4 g of azobis dimethylvaleronitrile, and 18 g of methyl ethyl ketone, was dropped in the flask over a period of 2.5 hours. Subsequently, another mixture liquid including 0.8 g of azobis dimethylvaleronitrile and 18 g of methyl ethyl ketone was dropped in the flask over a period of 0.5 hours. The mixture in the flask was aged for 1 hour at 65° C. and then 0.8 g of azobis dimethylvaleronitrile were further added to the flask. The mixture in the flask was aged for an extra 1 hour. After the termination of the reaction, 364 g of methyl ethyl ketone were added to the flask. Thus, 800 g of a polymer solution was prepared. The polymer solution includes a polymer in an amount of 50% by weight.

Preparation Example 1

First, 28 g of the polymer solution prepared in Synthesis Example 1, 26 g of a phthalocyanine pigment (C.I. Pigment Blue 15:3), 13.6 g of a 1 mol/L aqueous solution of potassium hydroxide, 20 g of methyl ethyl ketone, and 30 g of ion-exchange water were mixed sufficiently. The mixture was kneaded for 20 times using a three roll mill NR-84A (from Noritake Co, Ltd.). The resulting paste was poured into 200 g of ion-exchange water and the mixture was agitated sufficiently. The methyl ethyl ketone and water were removed from the mixture using an evaporator. Thus, a cyan pigment dispersion was prepared.

Preparation Example 2

The procedure in Preparation Example 1 was repeated except for replacing the phthalocyanine pigment with C.I. Pigment Red 122. Thus, a magenta pigment dispersion was prepared.

Preparation Example 3

The procedure in Preparation Example 1 was repeated except for replacing the phthalocyanine pigment with C.I. Pigment Yellow 74. Thus, a yellow pigment dispersion was prepared.

Preparation Example 4

The procedure in Preparation Example 1 was repeated except for replacing the phthalocyanine pigment with a carbon black. Thus, a black pigment dispersion was prepared.

Example 1

Preparation of Cyan Ink 1

First, (1) 8.0% by weight of glycerin and 24.0% by weight of diethylene glycol, (2) 0.3% by weight of a fluorine-based surfactant (SURFLON® S386 from AGC Seimi Chemical Co., Ltd.), and (3) 62.7% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 1 was prepared.

Preparation of Magenta Ink 1

First, (1) 8.2% by weight of glycerin and 24.6% by weight of diethylene glycol, (2) 0.3% by weight of a fluorine-based surfactant (SURFLON® S386 from AGC Seimi Chemical Co., Ltd.), and (3) 61.9% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 1 was prepared.

Preparation of Yellow Ink 1

First, (1) 8.2% by weight of glycerin and 24.6% by weight of diethylene glycol, (2) 0.3% by weight of a fluorine-based surfactant (SURFLON® S386 from AGC Seimi Chemical Co., Ltd.), and (3) 61.9% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 1 was prepared.

Preparation of Black Ink 1

First, (1) 8.5% by weight of glycerin and 25.5% by weight of diethylene glycol, (2) 0.3% by weight of a fluorine-based surfactant (SURFLON® S386 from AGC Seimi Chemical Co., Ltd.), and (3) 60.7% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 1 was prepared.

Example 2

Preparation of Cyan Ink 2

First, (1) 8.0% by weight of glycerin and 24.0% by weight of diethylene glycol, (2) 0.1% by weight of a fluorine-based surfactant having the following formula (α), and (3) 62.9% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 1 was prepared.

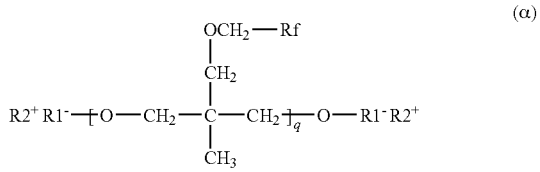

(α)

wherein Rf represents $CF_3$, $R1^-$ represents $SO_3^-$, $R2^+$ represents $NH_4^+$, and q represents 6.

Preparation of Magenta Ink 2

First, (1) 8.2% by weight of glycerin and 24.6% by weight of diethylene glycol, (2) 0.1% by weight of a fluorine-based surfactant having the formula (α), and (3) 62.1% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 2 was prepared.

Preparation of Yellow Ink 2

First, (1) 8.2% by weight of glycerin and 24.6% by weight of diethylene glycol, (2) 0.1% by weight of a fluorine-based surfactant having the formula (α), and (3) 62.1% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 2 was prepared.

Preparation of Black Ink 2

First, (1) 8.5% by weight of glycerin and 25.5% by weight of diethylene glycol, (2) 0.1% by weight of a fluorine-based surfactant having the formula (α), and (3) 60.9% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 2 was prepared.

Example 3

Preparation of Cyan Ink 3

First, (1) 8.0% by weight of glycerin and 24.0% by weight of diethylene glycol, (2) 1.0% by weight of a fluorine-based surfactant having the formula (α), and (3) 62.0% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 3 was prepared.

Preparation of Magenta Ink 3

First, (1) 8.2% by weight of glycerin and 24.6% by weight of diethylene glycol, (2) 1.0% by weight of a fluorine-based surfactant having the formula (α), and (3) 61.2% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 3 was prepared.

Preparation of Yellow Ink 3

First, (1) 8.2% by weight of glycerin and 24.6% by weight of diethylene glycol, (2) 1.0% by weight of a fluorine-based surfactant having the formula (α), and (3) 61.2% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 3 was prepared.

Preparation of Black Ink 3

First, (1) 8.5% by weight of glycerin and 25.5% by weight of diethylene glycol, (2) 1.0% by weight of a fluorine-based surfactant having the formula (α), and (3) 60.0% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 3 was prepared.

Example 4

Preparation of Cyan Ink 4

First, (1) 8.0% by weight of glycerin and 24.0% by weight of diethylene glycol, (2) 1.0% by weight of a fluorine-based surfactant having the following formula (β), and (3) 62.0% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 4 was prepared.

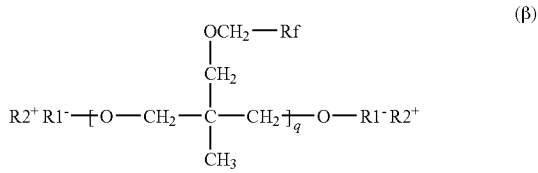

(β)

wherein Rf represents $CF_2CF_3$, $R1^-$ represents $SO_3^-$, $R2^+$ represents $NH_4^+$, and q represents 6.

Preparation of Magenta Ink 4

First, (1) 8.2% by weight of glycerin and 24.6% by weight of diethylene glycol, (2) 1.0% by weight of a fluorine-based surfactant having the formula (β), and (3) 61.2% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 4 was prepared.

Preparation of Yellow Ink 4

First, (1) 8.2% by weight of glycerin and 24.6% by weight of diethylene glycol, (2) 1.0% by weight of a fluorine-based surfactant having the formula (β), and (3) 61.2% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 4 was prepared.

Preparation of Black Ink 4

First, (1) 8.5% by weight of glycerin and 25.5% by weight of diethylene glycol, (2) 1.0% by weight of a fluorine-based surfactant having the formula (β), and (3) 60.0% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 4 was prepared.

Example 5

Preparation of Cyan Ink 5

First, (1) 8.0% by weight of glycerin and 24.0% by weight of diethylene glycol, (2) 1.0% by weight of a fluorine-based surfactant (FC-4432 from Sumitomo 3M Limited), and (3) 62.0% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 5 was prepared.

Preparation of Magenta Ink 5

First, (1) 8.2% by weight of glycerin and 24.6% by weight of diethylene glycol, (2) 1.0% by weight of a fluorine-based surfactant (FC-4432 from Sumitomo 3M Limited), and (3) 61.2% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 5 was prepared.

Preparation of Yellow Ink 5

First, (1) 8.2% by weight of glycerin and 24.6% by weight of diethylene glycol, (2) 1.0% by weight of a fluorine-based surfactant (FC-4432 from Sumitomo 3M Limited), and (3) 61.2% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 5 was prepared.

Preparation of Black Ink 5

First, (1) 8.5% by weight of glycerin and 25.5% by weight of diethylene glycol, (2) 1.0% by weight of a fluorine-based surfactant (FC-4432 from Sumitomo 3M Limited), and (3) 60.0% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 5 was prepared.

Example 6

Preparation of Cyan Ink 6

First, (1) 8.0% by weight of glycerin and 24.0% by weight of diethylene glycol, (2) 0.3% by weight of a fluorine-based surfactant (FC-4430 from Sumitomo 3M Limited), and (3) 62.7% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 0.1 hour. The resulting mixture was filtered with a membrane filter with a pore diameter of 0.8 μm. Thus, a cyan ink 6 was prepared.

Preparation of Magenta Ink 6

First, (1) 8.2% by weight of glycerin and 24.6% by weight of diethylene glycol, (2) 0.3% by weight of a fluorine-based surfactant (FC-4430 from Sumitomo 3M Limited), and (3) 61.9% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 6 was prepared.

Preparation of Yellow Ink 6

First, (1) 8.2% by weight of glycerin and 24.6% by weight of diethylene glycol, (2) 0.3% by weight of a fluorine-based surfactant (FC-4430 from Sumitomo 3M Limited), and (3) 61.9% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 6 was prepared.

Preparation of Black Ink 6

First, (1) 8.5% by weight of glycerin and 25.5% by weight of diethylene glycol, (2) 0.3% by weight of a fluorine-based surfactant (FC-4430 from Sumitomo 3M Limited), and (3) 60.7% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 6 was prepared.

Example 7

Preparation of Cyan Ink 7

First, (1) 8.0% by weight of glycerin and 24.0% by weight of diethylene glycol, (2) 1.0% by weight of a fluorine-based surfactant having the following formula (γ), and (3) 62.0% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 7 was prepared.

$$CF_3CF_2(CF_2CF_2)_2-CH_2CH_2O(CH_2CH_2O)_{10}H \quad (\gamma)$$

Preparation of Magenta Ink 7

First, (1) 8.2% by weight of glycerin and 24.6% by weight of diethylene glycol, (2) 1.0% by weight of a fluorine-based surfactant having the formula (γ), and (3) 61.2% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 7 was prepared.

Preparation of Yellow Ink 7

First, (1) 8.2% by weight of glycerin and 24.6% by weight of diethylene glycol, (2) 1.0% by weight of a fluorine-based surfactant having the formula (γ), and (3) 61.2% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 7 was prepared.

Preparation of Black Ink 7

First, (1) 8.5% by weight of glycerin and 25.5% by weight of diethylene glycol, (2) 1.0% by weight of a fluorine-based surfactant having the formula (γ), and (3) 60.0% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 7 was prepared.

Example 8

Preparation of Cyan Ink 8

First, (1) 8.0% by weight of glycerin and 24.0% by weight of diethylene glycol, (2) 1.0% by weight of a fluorine-based surfactant having the formula (γ), and (3) 60.0% by weight of ion-exchange water were mixed in this order and agitated for 30 minutes. Next, (4) 5.0% by weight (on solid basis) of the cyan pigment dispersion prepared in Preparation Example 1 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a cyan ink 8 was prepared.

Preparation of Magenta Ink 8

First, (1) 8.2% by weight of glycerin and 24.6% by weight of diethylene glycol, (2) 1.0% by weight of a fluorine-based surfactant having the formula (γ), and (3) 59.2% by weight of ion-exchange water were mixed in this order and agitated for 30 minutes. Next, (4) 5.0% by weight (on solid basis) of the magenta pigment dispersion prepared in Preparation Example 2 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a magenta ink 8 was prepared.

Preparation of Yellow Ink 8

First, (1) 8.2% by weight of glycerin and 24.6% by weight of diethylene glycol, (2) 1.0% by weight of a fluorine-based surfactant having the formula (γ), and (3) 59.2% by weight of ion-exchange water were mixed in this order and agitated for 30 minutes. Next, (4) 5.0% by weight (on solid basis) of the yellow pigment dispersion prepared in Preparation Example 3 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a yellow ink 8 was prepared.

Preparation of Black Ink 8

First, (1) 8.5% by weight of glycerin and 25.5% by weight of diethylene glycol, (2) 1.0% by weight of a fluorine-based surfactant having the formula (γ), and (3) 58.0% by weight of ion-exchange water were mixed in this order and agitated for 30 minutes. Next, (4) 5.0% by weight (on solid basis) of the black pigment dispersion prepared in Preparation Example 4 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a black ink 8 was prepared.

Example 9

Preparation of Cyan Ink 9

First, (1) 8.0% by weight of glycerin and 24.0% by weight of diethylene glycol, (2) 1.0% by weight of a fluorine-based surfactant having the formula (γ), and (3) 60.0% by weight of ion-exchange water were mixed in this order and agitated for 30 minutes. Next, (4) 5.0% by weight (on solid basis) of the cyan pigment dispersion prepared in Preparation Example 1 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a cyan ink 9 was prepared.

Preparation of Magenta Ink 9

First, (1) 8.2% by weight of glycerin and 24.6% by weight of diethylene glycol, (2) 1.0% by weight of a fluorine-based surfactant having the formula (γ), and (3) 59.2% by weight of ion-exchange water were mixed in this order and agitated for 30 minutes. Next, (4) 5.0% by weight (on solid basis) of the magenta pigment dispersion prepared in Preparation Example 2 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a magenta ink 9 was prepared.

Preparation of Yellow Ink 9

First, (1) 8.2% by weight of glycerin and 24.6% by weight of diethylene glycol, (2) 1.0% by weight of a fluorine-based surfactant having the formula (γ), and (3) 59.2% by weight of ion-exchange water were mixed in this order and agitated for 30 minutes. Next, (4) 5.0% by weight (on solid basis) of the yellow pigment dispersion prepared in Preparation Example 3 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a yellow ink 9 was prepared.

Preparation of Black Ink 9

First, (1) 8.5% by weight of glycerin and 25.5% by weight of diethylene glycol, (2) 1.0% by weight of a fluorine-based surfactant having the formula (γ), and (3) 58.0% by weight of ion-exchange water were mixed in this order and agitated for 30 minutes. Next, (4) 5.0% by weight (on solid basis) of the black pigment dispersion prepared in Preparation Example 4 and (5) 2.0% by Weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a black ink 9 was prepared.

Comparative Example 1

Preparation of Cyan Ink 10

First, (1) 8.0% by weight of glycerin and 24.0% by weight of diethylene glycol, (2) 1.0% by weight of a surfactant (SOFTANOL EP-7025 from Nippon Shokubai Co., Ltd.), and (3) 62.0% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 10 was prepared.

Preparation of Magenta Ink 10

First, (1) 8.2% by weight of glycerin and 24.6% by weight of diethylene glycol, (2) 1.0% by weight of a surfactant (SOFTANOL EP-7025 from Nippon Shokubai Co., Ltd.), and (3) 61.2% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 10 was prepared.

Preparation of Yellow Ink 10

First, (1) 8.2% by weight of glycerin and 24.6% by weight of diethylene glycol, (2) 1.0% by weight of a surfactant (SOFTANOL EP-7025 from Nippon Shokubai Co., Ltd.), and (3) 61.2% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 10 was prepared.

Preparation of Black Ink 10

First, (1) 8.5% by weight of glycerin and 25.5% by weight of diethylene glycol, (2) 1.0% by weight of a surfactant (SOFTANOL EP-7025 from Nippon Shokubai Co., Ltd.), and (3) 60.0% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 10 was prepared.

Comparative Example 2

Preparation of Cyan Ink 11

First, (1) 8.1% by weight of glycerin and 24.3% by weight of diethylene glycol, (2) 0.3% by weight of a fluorine-based surfactant (SURFLON® 5386 from AGC Seimi Chemical Co., Ltd.), and (3) 62.3% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 11 was prepared.

Preparation of Magenta Ink 11

First, (1) 8.1% by weight of glycerin and 24.3% by weight of diethylene glycol, (2) 0.3% by weight of a fluorine-based surfactant (SURFLON® S386 from AGC Seimi Chemical Co., Ltd.), and (3) 62.3% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 11 was prepared.

Preparation of Yellow Ink 11

First, (1) 8.1% by weight of glycerin and 24.3% by weight of diethylene glycol, (2) 0.3% by weight of a fluorine-based surfactant (SURFLON® 5386 from AGC Seimi Chemical Co., Ltd.), and (3) 62.3% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 11 was prepared.

Preparation of Black Ink 11

First, (1) 8.1% by weight of glycerin and 24.3% by weight of diethylene glycol, (2) 0.3% by weight of a fluorine-based surfactant (SURFLON® S386 from AGC Seimi Chemical Co., Ltd.), and (3) 62.3% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 11 was prepared.

Comparative Example 3

Preparation of Cyan Ink 12

First, (1) 8.1% by weight of glycerin and 24.3% by weight of diethylene glycol, (2) 1.0% by weight of a fluorine-based surfactant (FC-4432 from Sumitomo 3M Limited), and (3) 61.6% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 12 was prepared.

Preparation of Magenta Ink 12

First, (1) 8.1% by weight of glycerin and 24.3% by weight of diethylene glycol, (2) 1.0% by weight of a fluorine-based surfactant (FC-4432 from Sumitomo 3M Limited), and (3) 61.6% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 12 was prepared.

Preparation of Yellow Ink 12

First, (1) 8.1% by weight of glycerin and 24.3% by weight of diethylene glycol, (2) 1.0% by weight of a fluorine-based surfactant (FC-4432 from Sumitomo 3M Limited), and (3) 61.6% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 12 was prepared.

Preparation of Black Ink 12

First, (1) 8.1% by weight of glycerin and 24.3% by weight of diethylene glycol, (2) 1.0% by weight of a fluorine-based surfactant (FC-4432 from Sumitomo 3M Limited), and (3) 61.6% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 12 was prepared.

Comparative Example 4

Preparation of Cyan Ink 13

First, (1) 8.1% by weight of glycerin and 24.3% by weight of diethylene glycol, (2) 1.0% by weight of a fluorine-based surfactant having the formula (α), and (3) 61.6% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 13 was prepared.

Preparation of Magenta Ink 13

First, (1) 8.1% by weight of glycerin and 24.3% by weight of diethylene glycol, (2) 1.0% by weight of a fluorine-based surfactant having the formula (α), and (3) 61.6% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 13 was prepared.

Preparation of Yellow Ink 13

First, (1) 8.1% by weight of glycerin and 24.3% by weight of diethylene glycol, (2) 1.0% by weight of a fluorine-based surfactant having the formula (α), and (3) 61.6% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 13 was prepared.

Preparation of Black Ink 13

First, (1) 8.1% by weight of glycerin and 24.3% by weight of diethylene glycol, (2) 1.0% by weight of a fluorine-based surfactant having the formula (α), and (3) 61.6% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 13 was prepared.

Comparative Example 5

Preparation of Cyan Ink 14

First, (1) 8.1% by weight of glycerin and 24.3% by weight of diethylene glycol, (2) 1.0% by weight of a fluorine-based surfactant having the formula (γ), and (3) 61.6% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 14 was prepared.

Preparation of Magenta Ink 14

First, (1) 8.1% by weight of glycerin and 24.3% by weight of diethylene glycol, (2) 1.0% by weight of a fluorine-based surfactant having the formula (γ), and (3) 61.6% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 14 was prepared.

Preparation of Yellow Ink 14

First, (1) 8.1% by weight of glycerin and 24.3% by weight of diethylene glycol, (2) 1.0% by weight of a fluorine-based surfactant having the formula (γ), and (3) 61.6% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 14 was prepared.

Preparation of Black Ink 14

First, (1) 8.1% by weight of glycerin and 24.3% by weight of diethylene glycol, (2) 1.0% by weight of a fluorine-based surfactant having the formula (γ), and (3) 61.6% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 14 was prepared.

Comparative Example 6

Preparation of Cyan Ink 15

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the cyan pigment dispersion prepared in Preparation Example 1 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a cyan ink 15 was prepared.

Preparation of Magenta Ink 15

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the magenta pigment dispersion prepared in Preparation Example 2 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a magenta ink 15 was prepared.

Preparation of Yellow Ink 15

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the yellow, pigment dispersion prepared in Preparation Example 3 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a yellow ink 15 was prepared.

Preparation of Black Ink 15

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the black pigment dispersion prepared in Preparation Example 4 and (5) 2.0% by weight of a polyurethane resin emulsion (SF460S from Nippon Unicar Co., Ltd.) were further added in this order and the mixture was agitated for 1 hour. The resulting mixture was filtered with a membrane filter with a pore diameter of 0.8 μm. Thus, a black ink 15 was prepared.

Comparative Example 7

Preparation of Cyan Ink 16

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the cyan pigment dispersion prepared in Preparation Example 1 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a cyan ink 16 was prepared.

Preparation of Magenta Ink 16

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the magenta pigment dispersion prepared in Preparation Example 2 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a magenta ink 16 was prepared.

Preparation of Yellow Ink 16

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the yellow pigment dispersion prepared in Preparation Example 0.3 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a yellow ink 16 was prepared.

Preparation of Black Ink 16

First, (1) 8.1% by weight of glycerin and 24.3% by weight of diethylene glycol, (2) 1.0% by weight of a fluorine-based surfactant having the formula (γ), and (3) 59.6% by weight of ion-exchange water were mixed in this order and agitated for 30 minutes. Next, (4) 5.0% by weight (on solid basis) of the black pigment dispersion prepared in Preparation Example 4 and (5) 2.0% by weight of an acrylic silicone resin emulsion (AP4710 from Showa Highpolymer Co., Ltd.) were further added in this order and the mixture was agitated for 1 hour. The resulting mixture was filtered with a membrane filter with a pore diameter of 0.8 μm. Thus, a black ink 16 was prepared.

Example 10

Preparation of Cyan Ink 17

First, (1) 7.8% by weight of glycerin and 23.0% by weight of diethylene glycol, (2) 0.3% by weight of a fluorine-based surfactant (SURFLON® 5386 from AGC Seimi Chemical Co., Ltd.), and (3) 63.9% by weight of ion-exchange water were mixed in this order and agitated for 30 minutes. Next, (4) 5.0% by weight (on solid basis) of the cyan pigment dispersion prepared in Preparation Example 1 were further added and the mixture was agitated for 1 hour. The resulting mixture was filtered with a membrane filter with a pore diameter of 0.8 μm. Thus, a cyan ink 17 was prepared.

Preparation of Magenta Ink 17

First, (1) 8.0% by weight of glycerin and 24.3% by weight of diethylene glycol, (2) 0.3% by weight of a fluorine-based surfactant (SURFLON® 5386 from AGC Seimi Chemical Co., Ltd.), and (3) 62.4% by weight of ion-exchange water were mixed in this order and agitated for 30 minutes. Next, (4) 5.0% by weight (on solid basis) of the magenta pigment dispersion prepared in Preparation Example 2 were further added and the mixture was agitated for 1 hour. The resulting mixture was filtered with a membrane filter with a pore diameter of 0.8 μm. Thus, a magenta ink 17 was prepared.

Preparation of Yellow Ink 17

First, (1) 8.0% by weight of glycerin and 24.3% by weight of diethylene glycol, (2) 0.3% by weight of a fluorine-based surfactant (SURFLON® S386 from AGC Seimi Chemical Co., Ltd.), and (3) 62.4% by weight of ion-exchange water were mixed in this order and agitated for 30 minutes. Next, (4) 5.0% by weight (on solid basis) of the yellow pigment dispersion prepared in Preparation Example 3 were further added and the mixture was agitated for 1 hour. The resulting mixture was filtered with a membrane filter with a pore diameter of 0.8 μm. Thus, a yellow ink 17 was prepared.

Preparation of Black Ink 17

First, (1) 8.0% by weight of glycerin and 26.0% by weight of diethylene glycol, (2) 0.3% by weight of a fluorine-based surfactant (SURFLON® S386 from AGC Seimi Chemical Co., Ltd.), and (3) 60.7% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 17 was prepared.

Example 11

Preparation of Cyan Ink 18

The cyan ink 17 prepared in Example 10 was used as a cyan ink 18.

Preparation of Magenta Ink 18

The magenta ink 17 prepared in Example 10 was used as a magenta ink 18.

Preparation of Yellow Ink 18

The yellow ink 17 prepared in Example 10 was used as a yellow ink 18.

Preparation of Black Ink 18

First, (1) 8.2% by weight of glycerin and 26.1% by weight of diethylene glycol, (2) 0.3% by weight of a fluorine-based surfactant (SURFLON® 5386 from AGC Seimi Chemical Co., Ltd.), and (3) 60.4% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 18 was prepared.

Comparative Example 8

Preparation of Cyan Ink 19

The cyan ink 17 prepared in Example 10 was used as a cyan ink 19.

Preparation of Magenta Ink 19

The magenta ink 17 prepared in Example 10 was used as a magenta ink 19.

Preparation of Yellow Ink 19

The yellow ink 17 prepared in Example 10 was used as a yellow ink 19.

Preparation of Black Ink 19

First, (1) 8.5% by weight of glycerin and 26.3% by weight of diethylene glycol, (2) 0.3% by weight of a fluorine-based surfactant (SURFLON® 5386 from AGC Seimi Chemical Co., Ltd.), and (3) 59.9% by weight of ion-exchange water were mixed in this order and agitated for 30 minutes. Next, (4) 5.0% by weight (on solid basis) of the black pigment dispersion prepared in Preparation Example 4 were further added and the mixture was agitated for 1 hour. The resulting mixture was filtered with a membrane filter with a pore diameter of 0.8 μm. Thus, a black ink 19 was prepared.

The above-prepared ink sets were subjected to the following evaluations.

(1) Viscosity

Each of the inks was subjected to a measurement of viscosity at a temperature of 25° C. and a shearing speed of 230 1/s and 100,000 1/s, respectively, using a rheometer PHYSICA MCR 301 (from Anton Paar GmbH).

(2) Surface Tension

Each of the inks was subjected to a measurement of static surface tension at a temperature of 25° C. using a surface tensiometer CBVP-Z (from Kyowa Interface Science Co., Ltd.) with a platinum plate.

(3) Ink Mists

Each of the ink sets was mounted on a printer IPSIO G707 (from Ricoh Co., Ltd.), the configuration of which is illustrated in FIGS. 3 and 4. A printing pattern in which 5% of the area is occupied with images or characters was printed on 200 sheets of paper while setting the printer mode to "rapid printing on normal paper", at 25° C. and 50% RH. After printing 200 sheets, the inside of the printer was visually observed to determine the degree of ink contamination. The degree of ink contamination was graded into the following 3 levels.

A: No ink contamination was observed inside the printer.

B: A slight ink contamination was observed inside the printer.

C: A significant ink contamination was observed inside the printer.

(4) Image Blurring

Each of the ink sets was mounted on a printer IPSIO G707 (from Ricoh Co., Ltd.), the configuration of which is illustrated in FIGS. 3 and 4. Yellow characters were printed on a magenta background, and visually observed to determine the degree of image blurring. The degree of image blurring was graded into the following 3 levels.

A: No image blurring was observed. A high-definition image.

B: A slight image blurring was observed.

C: A significant image blurring was observed. The outlines of the characters could not be recognized.

(5) Color Saturation

Each of the ink sets was mounted on a printer IPSIO G707 (from Ricoh Co., Ltd.), the configuration of which is illustrated in FIGS. 3 and 4. A magenta solid image was printed on a sheet of a paper TYPE 6200 (from NBS Ricoh) while setting the printer mode to "rapid printing on normal paper", at 25° C.

and 50% RH. The magenta solid image was subjected to a measurement of color saturation using a densitometer X-Rite. The measured color saturation was graded into the following 3 levels.

A: 55 or more
B: 50 or more and less than 55
C: less than 50

Here, the color saturation is defined by the following equation:

$$\sqrt{a^2+b^2}$$

wherein a and b represent chromaticity coordinates on a color chromaticity diagram. Namely, the color saturation represents the distance between a chromaticity dot and the origin point.

The evaluation results are shown in Tables 1 and 2.

TABLE 1

| | | At 230 (1/s) | | At 100,000 (1/s) | | |
|---|---|---|---|---|---|---|
| | | Viscosity (mPa·s) | Viscosity Difference (mPa·s) | Viscosity (mPa·s) | Viscosity Difference (mPa·s) | Surface Tension (mN/m) |
| Ex. 1 | C | 6.2 | 1.7 | 5.9 | 0.3 | 35 |
| | M | 7.1 | | 5.9 | | 35 |
| | Y | 6.9 | | 6.2 | | 35 |
| | K | 7.9 | | 6.2 | | 35 |
| Ex. 2 | C | 6.3 | 1.7 | 5.8 | 0.4 | 33 |
| | M | 7.2 | | 5.9 | | 33 |
| | Y | 7.0 | | 5.8 | | 33 |
| | K | 8.0 | | 6.3 | | 33 |
| Ex. 3 | C | 6.2 | 1.7 | 5.9 | 0.2 | 29 |
| | M | 7.2 | | 5.9 | | 29 |
| | Y | 7.0 | | 6.1 | | 29 |
| | K | 7.9 | | 6.1 | | 29 |
| Ex. 4 | C | 6.3 | 1.7 | 5.8 | 0.3 | 27 |
| | M | 7.1 | | 5.8 | | 27 |
| | Y | 7.0 | | 6.0 | | 27 |
| | K | 8.0 | | 6.1 | | 27 |
| Ex. 5 | C | 6.3 | 1.7 | 5.9 | 0.4 | 21 |
| | M | 7.1 | | 5.9 | | 21 |
| | Y | 6.9 | | 6.3 | | 21 |
| | K | 8.0 | | 6.3 | | 21 |
| Ex. 6 | C | 6.2 | 1.8 | 5.7 | 0.4 | 30 |
| | M | 7.0 | | 5.8 | | 30 |
| | Y | 6.8 | | 6.0 | | 30 |
| | K | 8.0 | | 6.1 | | 30 |
| Ex. 7 | C | 6.3 | 1.7 | 5.8 | 0.4 | 25 |
| | M | 7.2 | | 5.9 | | 25 |
| | Y | 6.9 | | 6.1 | | 25 |
| | K | 8.0 | | 6.2 | | 25 |
| Ex. 8 | C | 7.3 | 1.8 | 6.9 | 0.3 | 25 |
| | M | 8.5 | | 6.9 | | 25 |
| | Y | 8.0 | | 7.0 | | 25 |
| | K | 9.1 | | 7.2 | | 25 |
| Ex. 9 | C | 7.2 | 1.6 | 6.8 | 0.2 | 25 |
| | M | 8.4 | | 6.9 | | 25 |
| | Y | 7.9 | | 6.9 | | 25 |
| | K | 8.8 | | 7.0 | | 25 |
| Ex. 10 | C | 6.0 | 1.9 | 5.4 | 0.4 | 35 |
| | M | 7.1 | | 5.8 | | 35 |
| | Y | 6.7 | | 5.8 | | 35 |
| | K | 7.9 | | 5.8 | | 35 |
| Ex. 11 | C | 6.0 | 2.0 | 5.4 | 0.4 | 35 |
| | M | 7.1 | | 5.8 | | 35 |
| | Y | 6.7 | | 5.8 | | 35 |
| | K | 8.0 | | 5.8 | | 35 |
| Comp. Ex. 1 | C | 6.3 | 1.6 | 5.9 | 0.3 | 35 |
| | M | 7.1 | | 6.0 | | 35 |
| | Y | 6.9 | | 6.2 | | 35 |
| | K | 7.9 | | 6.2 | | 35 |
| Comp. Ex. 2 | C | 6.7 | 0.3 | 6.5 | 1.0 | 35 |
| | M | 6.8 | | 5.7 | | 35 |
| | Y | 6.7 | | 6.0 | | 35 |
| | K | 7.0 | | 5.5 | | 35 |

TABLE 1-continued

| | | At 230 (1/s) | | At 100,000 (1/s) | | |
|---|---|---|---|---|---|---|
| | | Viscosity (mPa·s) | Viscosity Difference (mPa·s) | Viscosity (mPa·s) | Viscosity Difference (mPa·s) | Surface Tension (mN/m) |
| Comp. Ex. 3 | C | 6.6 | 0.4 | 6.4 | 0.8 | 21 |
| | M | 6.9 | | 5.9 | | 21 |
| | Y | 6.9 | | 6.1 | | 21 |
| | K | 7.0 | | 5.6 | | 21 |
| Comp. Ex. 4 | C | 6.6 | 0.3 | 6.4 | 0.9 | 30 |
| | M | 6.8 | | 5.7 | | 30 |
| | Y | 6.7 | | 6.1 | | 30 |
| | K | 6.9 | | 5.5 | | 30 |
| Comp. Ex. 5 | C | 6.7 | 0.3 | 6.5 | 0.8 | 25 |
| | M | 6.8 | | 5.7 | | 25 |
| | Y | 6.7 | | 6.0 | | 25 |
| | K | 7.0 | | 5.7 | | 25 |
| Comp. Ex. 6 | C | 7.7 | 0.3 | 7.4 | 1.1 | 25 |
| | M | 7.9 | | 6.6 | | 25 |
| | Y | 7.8 | | 7.0 | | 25 |
| | K | 8.0 | | 6.3 | | 25 |
| Comp. Ex. 7 | C | 7.6 | 0.4 | 7.3 | 1.1 | 25 |
| | M | 7.9 | | 6.5 | | 25 |
| | Y | 7.9 | | 7.1 | | 25 |
| | K | 8.0 | | 6.2 | | 25 |
| Comp. Ex. 8 | C | 6.0 | 2.1 | 5.4 | 0.5 | 35 |
| | M | 7.1 | | 5.8 | | 35 |
| | Y | 6.7 | | 5.8 | | 35 |
| | K | 8.1 | | 5.9 | | 35 |

TABLE 2

| | Ink Mists | Image Blurring | Color Saturation |
|---|---|---|---|
| Ex. 1 | A | B | B |
| Ex. 2 | A | B | B |
| Ex. 3 | A | B | A |
| Ex. 4 | A | B | A |
| Ex. 5 | A | B | A |
| Ex. 6 | A | B | A |
| Ex. 7 | A | B | A |
| Ex. 8 | A | A | A |
| Ex. 9 | A | A | A |
| Ex. 10 | A | B | B |
| Ex. 11 | A | B | B |
| Comp. Ex. 1 | B | C | C |
| Comp. Ex. 2 | C | B | B |
| Comp. Ex. 3 | C | B | B |
| Comp. Ex. 4 | C | B | B |
| Comp. Ex. 5 | C | B | B |
| Comp. Ex. 6 | C | B | B |
| Comp. Ex. 7 | C | B | B |
| Comp. Ex. 8 | B | C | B |

Examples 1 to 11 attained good results with regard to the evaluations of ink mists, image blurring, and color saturation. With regard to image blurring, Examples 8 and 9 attained much better results than the others because the inks were including a polyurethane resin emulsion or an acrylic silicone resin emulsion.

The results of the evaluation of ink mist in Comparative Examples 2 to 7 were C. The result of the evaluation of image blurring in Comparative Example 8 was C. The results of the evaluations of image blurring and color saturation in Comparative Example 1 were C because the inks were including no fluorine-based surfactant.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2008-279323, filed on Oct. 30, 2008, the entire contents of which are herein incorporated by reference.

What is claimed is:

1. An ink set for ink-jet recording, comprising multiple inks having different colors,
   wherein each of the multiple inks comprises:
   a colorant;
   a water-soluble organic solvent;
   a fluorine-based surfactant; and
   water, and
   wherein a viscosity difference among the multiple inks is 2.0 mPa·s or less at a temperature of 25° C. and a shearing speed of 230 1/s, and a viscosity difference among the multiple inks is 0.5 mPa·s or less at a temperature of 25° C. and a shearing speed of 100,000 1/s.

2. An ink cartridge, comprising:
   a container; and
   the ink set according to claim 1 contained in the container.

3. An ink-jet recording method, comprising:
   applying a stimulus to the multiple inks in the ink set according to claim 1; and
   flying the multiple inks to form an image.

4. An ink-jet recording apparatus, comprising:
   a stimulus applying device configured to apply a stimulus to the multiple inks in the ink set according to claim 1; and
   an ink flying device configured to fly the multiple inks to form an image.

5. An ink set according to claim 1, wherein each of the multiple inks further comprises at least one resin emulsion selected from the group consisting of polyurethane resin emulsions and acrylic silicone resin emulsions.

* * * * *